United States Patent [19]
Matsuhiro et al.

[11] Patent Number: 5,217,934
[45] Date of Patent: Jun. 8, 1993

[54] HEAT RESISTIVE PHOSPHATE-ZIRCON COMPOSITE BODIES AND PROCESS FOR PRODUCING SAME

[75] Inventors: Keiji Matsuhiro, Nagoya; Tsuneaki Ohashi, Ohgaki, both of Japan

[73] Assignee: NGK Insulators, Ltd., Japan

[21] Appl. No.: 825,328

[22] Filed: Jan. 27, 1992

Related U.S. Application Data

[63] Continuation of Ser. No. 570,915, Aug. 22, 1990, abandoned.

[30] Foreign Application Priority Data

Sep. 7, 1989 [JP] Japan ................... 1-232079

[51] Int. Cl.$^5$ .............................. C04B 35/48
[52] U.S. Cl. .................... 501/106; 501/102; 501/103; 501/104
[58] Field of Search ............... 501/102, 103, 104, 105, 501/106

[56] References Cited

U.S. PATENT DOCUMENTS 4,925,816  5/1990  Watanabe et al. ............... 501/103

FOREIGN PATENT DOCUMENTS

| | | |
|---|---|---|
| 0163200 | 7/1985 | European Pat. Off. |
| 0260893 | 11/1988 | European Pat. Off. |
| 0306242 | 4/1989 | European Pat. Off. |
| 6340757 | 8/1986 | Japan |

OTHER PUBLICATIONS

Abstract (English): JP 63-40757. Nippon Ceramics Aug. 1, 1986.
Chemical Abstracts, vol. 108, No. 26, Jun. 1988, Columbus US, p. 259, abstract No. 225857h.
Journal of the American Ceramic Society, vol. 69, No. 1, Jan. 1986, Columbus US, pp. 1-6; T. Oota et al. "Thermal Expansion Behavior of NaZr$_2$(PO4)$_3$-Type Compounds".

*Primary Examiner*—Mark L. Bell
*Assistant Examiner*—C. M. Bonner
*Attorney, Agent, or Firm*—Parkhurst, Wendel & Rossi

[57] ABSTRACT

A heat resistive phosphate-zircon composite body including a main crystalline phase and a secondary crystalline phase, the main crystalline phase being a solid-solved phase of $R_yZr_4Si_xP_{6-x}O_{24}$ in which $0<x<2$, $\frac{2}{3}<y<2$, and R includes of one or more kinds of bivalent or trivalent cations (provided that x and y satisfy electrical neutrality), and the secondary crystalline phase being zircon. A process for producing a heat resistive phosphate-zircon composite body is also disclosed. The process includes the steps of measuring and mixing given amounts of $ZrP_2O_7$, $(ZrO)_2P_2O_7$, RO and/or a phosphate of R, $SiO_2$ and a zircon powder, shaping the mixture and firing the shaped body, wherein the given amounts of $ZrP_2O_7$, $(ZrO)_2P_2O_7$, RO and/or the phosphate of R, and $SiO_2$ are measured such that the composite body may include a main crystalline phase composed of a solid-solved phase of $R_yZr_4Si_xP_{6-x}O_{24}$ and a secondary crystalline phase of zircon.

4 Claims, 3 Drawing Sheets

HEAT RESISTIVE PHOSPHATE-ZIRCON COMPOSITE BODIES AND PROCESS FOR PRODUCING SAME

This is a continuation of application Ser. No. 07/570,915 filed Aug. 22, 1990, now abandoned.

BACKGROUND OF THE INVENTION

1. Field of the Invention

The present invention relates to heat resistive phosphate-zircon composite bodies comprising a solid-solved phase having a composition of $R_yZr_4Si_xP_{6-x}O_{24}$ and a zircon phase. In the above formula, R consists of one or more kinds of elements capable of becoming bivalent or trivalent cations, x is a value less than 2, and y is a value satisfying an electrically neutral condition and greater than $\frac{2}{3}$ but less than 2. The invention also relates to a process for producing the same. More particularly, the present invention relates to heat resistive phosphate-zircon composite bodies having excellent high temperature thermal stability and strength and composed of the solid solved phase having the composition of $R_yZr_4Si_xP_{6-x}O_{24}$ having excellent heat resistance and high temperature stability and the zircon phase. The invention also relates to a process for producing the same.

2. Related Art Statement

Recently, demands for materials having excellent heat resistance and low expansion have been increasing with developments in industrial technology.

Under these demands, it has been made clear that zirconyl phosphate $[(ZrO)_2P_2O_7]$ is promising as a material having excellent heat resistance and low expansion.

Further, zirconium phosphates of alkali metals such as sodium have been recently proposed as materials having heat resistance and low coefficients of thermal expansion [Mat. Res. Bull., Vol. 19, pp 1451-1456 (1984), Journal of Materials Science 16, 1633-1642 (1981), and Yougyou Kyokaishi, 95[5], pp 531-537 (1987)).

Furthermore, phosphate compounds of alkaline earth metals having special compositions have bee proposed as having low expansion (Mat. Res. Bull., Vol. 20, pp 99-106, 1985, J. Am. Ceram. Soc., 70[10]C-232 to C-236 (1987) and U.S. Pat. No. 4,801,566).

U.S. Pat. No. 4,675,302 proposes that ceramic materials having a fundamental composition of $Ca_{0.5}Ti_2P_3O_{12}$ have excellent low expansion.

In addition, trials have been made to combine special phosphate compounds and zircon (Journal of Materials Science, Vol. 20, 4617-4623 (1985) and EP-0260893A2).

Moreover, EP-0306242A2 discloses a solid solved phase of $R_yZr_4Si_xP_{6-x}O_{24}$, sintered bodies containing this solid solved phase, and a process for producing the same.

However, although the phosphate compounds such as zirconyl phosphate have the merit that they have the excellent low expansion, the compounds are thermally decomposed at high temperatures more than 1,200° C. so that a phosphorus (S) component evaporates. For example, there is a problem that when thermally treated at 1,400° C. for 100 hours, zirconyl phosphate and zirconium sodium phosphate exhibit weight reductions of as much as 19% and 36%, respectively.

The ceramic materials proposed in U.S. Pat. No. 4,675,302 are used mainly as substrates for low expansion optical reflectors to be used in artificial satellites and undergoing no deformation or the like even due to changes in temperature. As shown in FIG. 2 of this publication, the temperature change is considered about 500° C. at the maximum. Thus, no consideration is paid at all with respect to stability and heat resistance at high temperatures, for example, not less than 1,200° C.

As a process for producing phosphate compounds, a process using a combination of $Na_2CO_3$, $ZrO_2$, $ZrOCl_2.8H_2O$, $SiO_2$, $(NH_4)_2HPO_4$, $H_3PO_4$, $Nb_2O_5$, $Y_2O_3$, $SrCO_3$, $K_2CO_3$, and $CaCO_3$ is known [T. Oota and I. Yamai, Journal of the American Ceramic Society. 69, 1 (1986)].

However, in the above process, a $P_2O_5$ component is singly produced during decomposition of ammonium phosphate or $H_3PO_4$, so that portions having high concentrations of phosphorus are locally formed, and a low melting point compound is formed during firing. Consequently, large pores (spaces) are formed around the low melting point compound in the sintered body, which causes great defects.

SUMMARY OF THE INVENTION

The present inventors had made various investigations to solve the problems of the above-mentioned related art techniques, and have discovered that high strength, heat resistive, low expansion composite bodies which maintain heat resistance and thermal stability can be obtained by co-existing the solid solved phase of $R_yZr_4Si_xP_{6-x}O_{24}$ and the zircon phase in the composite bodies to substantially have either one of the following compositions. The invention has been accomplished based on this discovery.

$$a(R_yZr_4Si_xP_{6-x}O_{24}) + b(ZrSiO_4) \tag{1}$$

$$R_sZr_4Si_tP_{6-t}O_{24-t/2} \tag{2}$$

In the above formula (1), $a+b=1$, and in the formula (2), $S=2/n$, $0<t\leq 4$, and n is a valence of ions of R.

That is, according to the present invention, the heat resistive composite body comprises the solid solved phase having the composition of $R_yZr_4Si_xP_{6-x}O_{24}$ (R consists of at least one kind of element selected from elements capable of becoming bivalent or trivalent cations, x is a figure less than 2, and y is a figure which satisfies an electrically neutral condition in the above chemical formula and which is greater than $\frac{2}{3}$ but less than 2) and a zircon phase. The composite body preferably has the composition expressed by the above formula (1) or (2). The present invention also provide a process for producing the heat resistive composite body, comprising the steps of obtaining a batch mixture by selecting $ZrP_2O_7$, $(ZrO)_2P_2O_7$, $ZrO_2$, $ZrSiO_4$, $SiO_2$, a phosphate of R, and RO (R consists of one or more kinds of elements capable of becoming bivalent or trivalent cations), shaping the mixture and firing the shaped body, wherein the mixture is formulated so that the fired body has a main crystalline phase of a $R_yZr_4Si_xP_{6-x}O_{24}$ solid solved phase ($0<X<2$, $\frac{2}{3}<y<2$, and R consists of one or more kinds of elements capable of becoming bivalent or trivalent cations, provided that x and y satisfy an electrically neutral condition in the above chemical formula). In this method, it is preferable that the mixture is formulated so that the composition of the sintered body may be $\{a(R_yZr_4Si_xP_{6-x}O_{24})+b(ZrSiO_4)\}$ or $R_sZr_4Si_tP_{6-t}O_{24}-t/2$ (a, b, x, y, s and t are the same meanings as given above, respectively).

These and other objects, features and advantages of the invention will be appreciated upon reading of the following description of the invention when taken in conjunction with the attached drawings, with the understanding that some modifications, variations and changes of the same could be made by the skilled person in the art to which the invention pertains without departing from the spirit of the invention or the scope of the appended claims.

BRIEF DESCRIPTION OF THE DRAWINGS

The present invention will be understood with reference to the attached drawings, wherein.

DETAILED DESCRIPTION OF THE INVENTION

Figure 1:
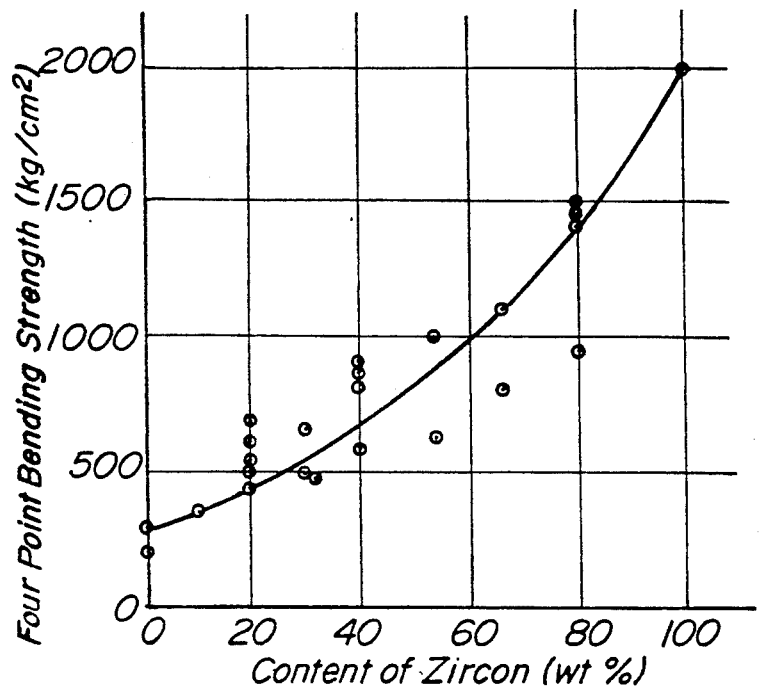
FIG. 1 is a graph in which contents of zircon and four point bending strengths are plotted with respect to Examples 1–24, Comparative Examples 32, 34, 35 and 37–39.

The present invention will be explained in more detail below.

In the solid solved phase having the composition of $R_yZr_4Si_xP_{6-x}O_{24}$ as one of the constituent features of the present invention, it is necessary that R consists of one or more kinds of elements selected from the elements capable of becoming bivalent or trivalent cations, x is a figure less than 2, and y is a figure greater than $\frac{2}{3}$ but less than 2. If a monovalent cation is contained in R, thermal stability at high temperatures is deteriorated. If x exceeds 2, heat resistance is damaged.

A high strength heat resistive composite body can be obtained by satisfying the above conditions.

R consists of one or more kinds of elements capable of becoming bivalent or trivalent cations, and generally denote elements belonging to Group IIa of the Periodic Table. It is preferable that R is constituted by one or more kinds of barium (Ba), strontium (Sr) and calcium (Ca).

Further, according to the composite body of the present invention, the weight-reduce percentage due to evaporation of the phosphorus after heat treatment at 1,400° C. for 100 hours may be suppressed to a low value of not more than 5%, preferably not more than 1%, and the four point bending strength may be not less than 350 kg/cm². In the composite body according to the present invention, it is preferable that the solid solved phase having the composition of $R_yZr_4Si_xP_{6-x}O_{24}$ is in a range of 20–90 wt% and the zircon phase is in a range of 10–80 wt%. If the content of zircon is less than 10 wt%, the bending strength is less than 350 kg/cm². In such cases, a effective effect owing to the incorporation of zircon will not be obtained. On the other hand, if the content of zircon is more than 80 wt%, the coefficient of thermal expansion becomes more than $40 \times 10^{-7}$/° C. so that the thermal shock resistance becomes insufficient. Furthermore, the self-weight softening percentage of the composite body after heat treatment at 1,400° C. for 5 hours is preferably not more than 0.3%, more preferably not more than 0.1%, which satisfies requirements needed for heat resistive materials.

The composite body has a small dimensional change percentage. It is preferable that the dimensional change percentage of the composite body is not more than 1% in the heat treatment at 1,400° C. for 100 hours. This also satisfies the requirements needed for the heat resistive materials. The composite body preferably has a low coefficient of thermal expansion of not more than $40 \times 10^{-7}$/° C., desirably $25 \times 10^{-7}$/° C. in a range from room temperature to 1,400° C. Thus, the composite body has excellent thermal shock resistance. Therefore, the composite bodies according to the present invention having the above characteristics may be favorably used as materials required to have heat resistance and heat stability at high temperatures, such as ceramic honeycomb structural bodies including automobile exhaust gas purification catalyst carriers, rotary regeneration type ceramic heat exchangers, heat conduction type heat exchangers, heat insulating materials for turbocharger rotor housing and engine manifolds, and diesel particulate filters.

Next, the process for producing the heat resistive composite body according to the present invention is characterized by the first feature that the starting material is a powdery batch mixture obtained from materials selected from $ZrP_2O_7$, $(ZrO)_2P_2O_7$, $ZrO_2$, $ZrSiO_4$, $SiO_2$, phosphates of R, and RO, wherein R consists of one or more kinds of elements capable of becoming bivalent or trivalent cations. That is, all of $ZrP_2O_7$, $(ZrO)_2P_2O_7$, $ZrO_2$, $ZrSiO_4$, $SiO_2$, and phosphates of R and RO are stable compounds, in which it is difficult to cause non-uniformity during the shaping and firing steps. Thus, they can be fired at high temperatures. These materials can produce ceramics having excellent heat resistance.

On the other hand, if phosphoric acid conventionally used is employed as the $P_2O_5$ source, the composition becomes non-uniform during mixing because phosphoric acid is liquid. Therefore, as mentioned above, portions where the concentration of phosphorus is high are locally formed so that a low melting point compound is produced. Consequently, a grevious defect will occur that great pores are formed around the low melting point compound in the sintered body. Further, when a honeycomb structure is obtained by extruding a ceramic material containing phosphoric acid, an extrusion-shaping die and a cylinder of an extruder are rusted or corroded because phosphoric acid is corrosive. This makes the shaping conspicuously difficult. Furthermore, if such a ceramic material is applied to a press shaping, it is essentially impossible to shape a powder thereof because of the presence of phosphoric acid.

The second feature of the process for producing the heat resistive composite material according to the present invention is that the starting material is formulated so that the composition of the composite body may have the specific ratios shown by the formula (1) or (2) mentioned above. The reason why the composition of the composite body needs to be set at the specific ratios is to control precipitation of a different phase. By controlling the precipitation of the different phase, the composite body having high strength, a low weight-reduced percentage or a low self-weight softening percentage can be obtained.

With respect to RO as one of the starting materials, a stable compound which is converted to RO, i.e., an oxide during firing, for example, a hydroxide, a carbonate, and a sulfate may selectively be used.

As the starting material, powder having the average grain size of not more than 50 μm, preferably not more than 10 μm is used.

The firing conditions of the composite body according to the present invention are that the firing temperature is not less than 1,400° C., preferably 1,500° to 1,600° C., and the firing time is 1–24 hours, preferably 2 to 10 hours. By setting the firing temperature at not less than 1,400° C., a sufficient amount of $R_yZr_4Si_xP_{6-x}O_{24}$ is precipitated, and the composite body according to the present invention can be obtained. Further, if the firing time is less than one hour, sintering becomes insufficient. On the other hand, if it is more than 24 hours, strength drops due to abnormal grain growth, and a different phase is precipitated owing to evaporation of phosphorus.

The above-explained preferable embodiments of the present invention are summarized as follows:

a) The heat resistive composite body has 20–90 wt% of the solid solved phase having the above-mentioned composition and 10–80 wt% of the zircon phase.

b) The heat resistive composite body has the self-weight softening percentage of not more than 0.3%, preferably not more than 0.1%, when thermally treated at 1,400° C. for 5 hours.

c) The heat resistive composite body has the weight-reduced percentage of not more than 5%, preferably not more than 1%, when thermally treated at 1,400° C. for 100 hours. d) The heat resistive composite body has the dimensional change percentage of not more than 1%, when thermally treated at 1,400° C. for 100 hours.

e) The heat resistive composite body has a four point bending strength of not less than 350 kg/cm².

f) The heat resistive composite body is shaped as a ceramic honeycomb structure.

g) The heat resistive composite body contains one or more kinds of elements belonging to Group IIa of Periodic Table as R.

h) The heat resistive composite body has a coefficient of thermal expansion of $40\times10^{-7}/°$ C., preferably not more than $25\times10^{-7}/°$ C. in a range from room temperature to 1,400° C.

i) The process for producing the heat resistive composite body is characterized by the firing at not less than 1,400° C. for 1–24 hours in air.

j) The process for producing the heat resistive composite body is characterized by using one or more kinds of the elements in Group IIa of the Periodic Table as R.

k) The process for producing the heat resistive composite body is characterized by selecting a material among a hydroxide, a carbonate and a sulfate to be converted to an oxide of R during firing as a starting material for RO.

l) The process for producing the heat resistive composite body is characterized by using the carbonate of R as the starting material for RO.

m) The process for producing the heat resistive composite body is characterized by using the starting material having the average grain size of not more than 10 μm.

EXAMPLES AND COMPARATIVE EXAMPLES

The present invention will be explained below with reference to Examples and Comparative Examples, but it is clear that the present invention is not limited to these Examples.

According to a compounding recipe given in Table 1, zirconyl phosphate [$(ZrO)_2P_2O_7$], zirconium phosphate ($ZrP_2O_7$), calcium carbonate, strontium carbonate, barium carbonate, yttria, zircon, silica, and/or zirconia were mixed. The grain size of zirconyl phosphate had been preliminarily controlled by using a vibration mill filled with sintered $ZrO_2$ grinding media having the diameter of about 5 mm. But, the grain size may be controlled by using a pot mill or an attritor mill. As the grinding media of the sintered $ZrO_2$ bodies, grinding media stabilized with MgO or those stabilized with $Y_2O_3$ were used. The chemical compositions of the grinding media used are shown in Table 2. Table 3 shows the chemical analysis values of the materials used.

Figure 5:
FIG. 5 is a view illustrating a process for measuring the self-weight softening percentage in the thermal treatment at 1,400° C. for 5 hours.

Five parts by weight of a 10% PVA aqueous solution was fully mixed with 100 parts by weight of the formulated mixture shown in Table 1, and the mixture was shaped with a mold having a size of 25×80×6 mm under pressure of 100 kg/cm² and rubber pressed under pressure of 2 tons/cm². After the shaped body was dried, the dried body was fired in air in an electric furnace under conditions given in Table 1. The heating rate was 5–1,700° C., After the firing, the fired bodies were worked in the form of bending test pieces having a size of 3×4×40 mm as prescribed in JIS R1601 (1981). With respect to the thus obtained test pieces, the weight-reduced percentage and the dimensional change percentage in the thermal treatment at 1,400° C. for 100 hours, the coefficient of thermal expansion in a range from 40 to 1,400° C., the four point bending strength, the self-weight softening percentage, and the open porosity were measured. A push rod differential type heat expansion meter using a sintered body of high purity alumina was used for the measurement of the coefficient of thermal expansion. The temperature range for the measurement was 40–1,400° C. The four point bending strength was measured by a method according to JIS R 1601. The self-weight softening percentage was determined by placing the above 3×4×40 mm bending test piece between supports spaced by 30 mm as shown in FIG. 5, thermally treating it at 1,400° C. for 5 hours in air, and measuring a self-weight deformed amount Δx at that time, and calculating by using the following equation.

Self-weight softening percentage=$\Delta x/\mu \times 100 (\%)$

The open porosity was measured by the Archemedean process. The melting point was visually judged by observing whether the test piece cut in a size of 3×4×5 mm was melted or not when it was thermally treated in the electric furnace at 1,700° C. for 10 minutes.

Whether the solid solved phase having the composition of $R_yZr_4Si_xP_{6-x}O_{24}$ was produced or not was judged by confirming whether indexing was possible or not with reference to $CaZr_4(PO_4)_6$ of JCPDS 33-321, $SrZr_4(PO_4)_6$ of JCPDS 33-1360 or $BaZr_4(PO_4)_6$ of JCPDS 34-95.

Whether the zircon phase was produced or not was judged by confirming that indexing was effected with reference to $ZrSiO_4$ of JCPDS 6-0266. The content of the zircon in the composite body was calculated based on a diffraction peak at a (200) plane. The content of the solid solved phase was judged to be 100% zircon when no other crystalline phase was detected.

With respect to other crystalline phases, the presence or absence thereof was identified with reference to X ray diffraction patterns. The lattice constants a and c of the solid solved phase were calculated by determining a plane space $d_{018}$ and $d_{208}$ from a reflection peak angle $2\theta$ at a (018) plane and a reflection peak angle at a (208) plane in $R_yZr_4Si_xP_{6-x}O_{24}$, and using the following simultaneous equations.

$$1/d^2_{018} = 4/3a^2 + 64/c^2$$

$$1/d^2_{208} = 16/3a^2 + 64/c^2$$

TABLE 1 (a)-1

| | | Example | | | | | | | | |
|---|---|---|---|---|---|---|---|---|---|---|
| | | 1 | 2 | 3 | 4 | 5 | 6 | 7 | 8 | 9 |
| Compound-<br>ing recipe<br>(wt %) | $Zr_2P_2O_9$ | 47.6 | 42.7 | 37.6 | 32.6 | 25.2 | 18.3 | 11.2 | 47.6 | 42.7 |
| | $ZrP_2O_7$ | 20.7 | 18.5 | 16.4 | 14.1 | 11 | 8 | 4.9 | 20.7 | 18.5 |
| | $CaCO_3$ | 0 | 0 | 0 | 0 | 0 | 0 | 0 | 0 | 0 |
| | $SrCO_3$ | 17.7 | 15.9 | 14 | 12.1 | 9.4 | 6.8 | 4.2 | 17.7 | 15.9 |
| | $BaCO_3$ | 0 | 0 | 0 | 0 | 0 | 0 | 0 | 0 | 0 |
| | $ZrO_2$ | 0 | 0 | 0 | 0 | 0 | 0 | 0 | 0 | 0 |
| | $Y_2O_3$ | 0 | 0 | 0 | 0 | 0 | 0 | 0 | 0 | 0 |
| | $SiO_2$ | 4.7 | 4.2 | 3.7 | 3.2 | 2.5 | 1.8 | 1.1 | 4.7 | 4.2 |
| | $ZrSiO_4$ | 9.3 | 18.7 | 28.3 | 38 | 51.9 | 65.1 | 78.6 | 9.3 | 18.7 |
| | Total | 100 | 100 | 100 | 100 | 100 | 100 | 100 | 100 | 100 |
| Chemical<br>composi-<br>tion of<br>RZSP solid<br>solved<br>phase<br>(mole %) | $CaZr_4P_6O_{24}$ | | | | | | | | | |
| | $SrZr_4P_6O_{24}$ | 83 | 83 | 83 | 83 | 83 | 83 | 83 | 83 | 83 |
| | $BaZr_4P_6O_{24}$ | | | | | | | | | |
| | $NiZr_4P_6O_{24}$ | | | | | | | | | |
| | $Ca_4Zr_4Si_6O_{24}$ | | | | | | | | | |
| | $Sr_4Zr_4Si_6O_{24}$ | 17 | 17 | 17 | 17 | 17 | 17 | 17 | 17 | 17 |
| | $Ba_4Zr_4Si_6O_{24}$ | | | | | | | | | |
| | $Y_{2/3}Zr_4P_6O_{24}$ | | | | | | | | | |
| Crystal-<br>line phase | RZSP solid solved phase | 90 | 80 | 70 | 60 | 46 | 33 | 20 | 90 | 80 |
| | Zircon | 10 | 20 | 30 | 40 | 54 | 67 | 80 | 10 | 20 |
| | Other crystalline phase | — | — | — | — | — | — | — | — | — |

TABLE 1 (b)-1

| | Example | | | | | | | | |
|---|---|---|---|---|---|---|---|---|---|
| | 1 | 2 | 3 | 4 | 5 | 6 | 7 | 8 | 9 |
| Lattice parameter of main crystalline phase | | | | | | | | | |
| a (Å) | 8.74 | 8.74 | 8.74 | 8.74 | 8.74 | 8.74 | 8.74 | 8.74 | 8.74 |
| c (Å) | 23.34 | 23.34 | 23.34 | 23.34 | 23.34 | 23.34 | 23.34 | 23.34 | 23.34 |
| Producing conditions | | | | | | | | | |
| Firing temperature (°C.) | 1600 | 1600 | 1600 | 1600 | 1600 | 1600 | 1600 | 1500 | 1500 |
| Keeping time (hr) | 5 | 5 | 5 | 5 | 5 | 5 | 5 | 5 | 5 |
| Firing shrinkage factor (%) | 19 | 19.4 | 19.6 | 19.6 | 19.5 | 19.2 | 19 | 15.7 | 14.9 |
| Characteristics of sintered body | | | | | | | | | |
| Open porosity (%) | 4.1 | 3.6 | 3.3 | 3.4 | 3.9 | 4.4 | 4.8 | 16.3 | 18.5 |
| Bending strength (kg/cm$^2$) | 350 | 490 | 660 | 800 | 1000 | 1100 | 1440 | 360 | 430 |
| Weight-reduced percentage (1400° C. × 100 hr, %) | 0.3 | 0.3 | 0.3 | 0.3 | 0.3 | 0.2 | 0.2 | 0.4 | 0.4 |
| Dimensional change percent-age (1400° C. × 100 hr, %) | −0.1 | 0 | −0.1 | −0.1 | −0.2 | −0.1 | −0.1 | −0.8 | −0.5 |
| Self-weight softening percentage (1400° C. × 5 hr, %) | 0.10 | 0.10 | 0.11 | 0.11 | 0.12 | 0.13 | 0.13 | 0.10 | 0.11 |
| Coefficient of thermal expansion (×10$^{-7}$/°C., RT-1400° C.) | −11 | 5 | 17 | 24 | 31 | 34 | 38 | 4 | 15 |
| Thermal expansion hysteresis loss (%) | | | | | | | | | |
| Melting point (°C.) | >1700 | >1700 | >1700 | >1700 | >1700 | >1700 | >1700 | >1700 | >1700 |

TABLE 1 (a)-2

| | | Example | | | | | | | | |
|---|---|---|---|---|---|---|---|---|---|---|
| | | 10 | 11 | 12 | 13 | 14 | 15 | 16 | 17 | 18 |
| Compound-<br>ing recipe<br>(wt %) | $Zr_2P_2O_9$ | 37.6 | 32.6 | 25.2 | 18.3 | 11.2 | 49.8 | 38.1 | 29 | 9.9 |
| | $ZrP_2O_7$ | 16.4 | 14.1 | 11 | 8 | 4.9 | 0 | 31.1 | 23.7 | 8.2 |
| | $CaCO_3$ | 0 | 0 | 0 | 0 | 0 | 0 | 9.7 | 7.4 | 2.6 |
| | $SrCO_3$ | 14 | 12.1 | 9.4 | 6.8 | 4.2 | 14.6 | 0 | 0 | 0 |
| | $BaCO_3$ | 0 | 0 | 0 | 0 | 0 | 0 | 0 | 0 | 0 |
| | $ZrO_2$ | 0 | 0 | 0 | 0 | 0 | 17.8 | 0 | 0 | 0 |
| | $Y_2O_3$ | 0 | 0 | 0 | 0 | 0 | 0 | 0 | 0 | 0 |
| | $SiO_2$ | 3.7 | 3.2 | 2.5 | 1.8 | 1.1 | 17.8 | 2.3 | 1.8 | 0.6 |
| | $ZrSiO_4$ | 28.3 | 38 | 51.9 | 65.1 | 78.6 | 0 | 18.8 | 38.1 | 78.7 |
| | Total | 100 | 100 | 100 | 100 | 100 | 100 | 100 | 100 | 100 |
| Chemical<br>composi- | $CaZr_4P_6O_{24}$ | | | | | | | 92 | 92 | 92 |
| | $SrZr_4P_6O_{24}$ | 83 | 83 | 83 | 83 | 83 | 75 | | | |

TABLE 1 (a)-2-continued

| | | Example | | | | | | | | |
|---|---|---|---|---|---|---|---|---|---|---|
| | | 10 | 11 | 12 | 13 | 14 | 15 | 16 | 17 | 18 |
| tion of | $BaZr_4P_6O_{24}$ | | | | | | | | | |
| RZSP solid | $NiZr_4P_6O_{24}$ | | | | | | | | | |
| solved | $Ca_4Zr_4Si_6O_{24}$ | | | | | | | 8 | 8 | 8 |
| phase | $Sr_4Zr_4Si_6O_{24}$ | 17 | 17 | 17 | 17 | 17 | 25 | | | |
| (mole %) | $Ba_4Zr_4Si_6O_{24}$ | | | | | | | | | |
| | $Y_{2/3}Zr_4P_6O_{24}$ | | | | | | | | | |
| Crystal- | RZSP solid solved phase | 70 | 60 | 46 | 33 | 20 | 68 | 80 | 60 | 20 |
| line phase | Zircon | 30 | 40 | 54 | 67 | 80 | 32 | 20 | 40 | 80 |
| | Other crystalline phase | — | — | — | — | — | — | — | — | — |

TABLE 1 (b)-2

| | Example | | | | | | | | |
|---|---|---|---|---|---|---|---|---|---|
| | 10 | 11 | 12 | 13 | 14 | 15 | 16 | 17 | 18 |
| Lattice parameter of main crystalline phase | | | | | | | | | |
| a (Å) | 8.74 | 8.74 | 8.74 | 8.74 | 8.74 | 8.75 | 8.79 | 8.79 | 8.79 |
| c (Å) | 23.34 | 23.34 | 23.34 | 23.34 | 23.34 | 23.33 | 22.68 | 22.68 | 22.68 |
| Producing conditions | | | | | | | | | |
| Firing temperature (°C.) | 1500 | 1500 | 1500 | 1500 | 1500 | 1600 | 1600 | 1600 | 1600 |
| Keeping time (hr) | 5 | 5 | 5 | 5 | 5 | 5 | 5 | 5 | 5 |
| Firing shrinkage factor (%) | 15.5 | 16.2 | 16.3 | 16.9 | 19.7 | 23.8 | 19.2 | 20.1 | 19.6 |
| Characteristics of sintered body | | | | | | | | | |
| Open porosity (%) | 16.7 | 14.2 | 14 | 12.6 | 11.1 | 4.7 | 5.1 | 4.6 | 5.1 |
| Bending strength (kg/cm$^2$) | 500 | 580 | 620 | 800 | 950 | 470 | 690 | 900 | 1500 |
| Weight-reduced percentage (1400° C. × 100 hr, %) | 0.4 | 0.4 | 0.3 | 0.3 | 0.2 | 0.3 | 0.6 | 0.5 | 0.44 |
| Dimensional change percentage (1400° C. × 100 hr, %) | −0.3 | −0.3 | −0.1 | −0.1 | −0.05 | −0.1 | −1 | −0.16 | −0.3 |
| Self-weight softening percentage (1400° C. × 5 hr, %) | 0.11 | 0.12 | 0.14 | 0.16 | 0.20 | 0.11 | 0.10 | 0.11 | 0.13 |
| Coefficient of thermal expansion (×10$^{-7}$/°C., RT-1400° C.) | 20 | 25 | 30 | 34 | 38 | −4 | 13 | 25 | 38 |
| Thermal expansion hysteresis loss (%) | | | | | | 0.39 | | | |
| Melting point (°C.) | >1700 | >1700 | >1700 | >1700 | >1700 | >1700 | >1700 | >1700 | >1700 |

TABLE 1 (a)-3

| | | Example | | | | | | | |
|---|---|---|---|---|---|---|---|---|---|
| | | 19 | 20 | 21 | 22 | 23 | 24 | 25 | 26 |
| Compound- | $Zr_2P_2O_9$ | 40.2 | 30.7 | 10.6 | 39.9 | 30.4 | 10.6 | 33.3 | 45.3 |
| ing recipe | $ZrP_2O_7$ | 24.4 | 18.5 | 6.3 | 17.3 | 13.2 | 4.5 | 0 | 8.5 |
| (wt %) | $CaCO_3$ | 0 | 0 | 0 | 0 | 0 | 0 | 0 | 5($Ca_3P_2O_8$) |
| | $SrCO_3$ | 11 | 8.3 | 2.8 | 0 | 0 | 0 | 14.7 | 3.6 |
| | $BaCO_3$ | 0 | 0 | 0 | 20 | 15.2 | 5.2 | 0 | 4.8 |
| | $ZrO_2$ | 0 | 0 | 0 | 0 | 0 | 0 | 28.3 | 0 |
| | $Y_2O_3$ | 2.1 | 1.6 | 0.5 | 0 | 0 | 0 | 0 | 0 |
| | $SiO_2$ | 3.3 | 2.5 | 0.9 | 4 | 3 | 1 | 23.7 | 3.8 |
| | $ZrSiO_4$ | 19 | 38.4 | 78.9 | 18.8 | 38.2 | 78.7 | 0 | 29 |
| | Total | 100 | 100 | 100 | 100 | 100 | 100 | 100 | 100 |
| Chemical | $CaZr_4P_6O_{24}$ | | | | | | | | 42 |
| composi- | $SrZr_4P_6O_{24}$ | 50 | 50 | 50 | 83 | 83 | 83 | 75 | 21 |
| tion of | $BaZr_4P_6O_{24}$ | | | | | | | | 21 |
| RZSP solid | $NiZr_4P_6O_{24}$ | | | | | | | | |
| solved | $Ca_4Zr_4Si_6O_{24}$ | | | | | | | | 8 |
| phase | $Sr_4Zr_4Si_6O_{24}$ | 12.5 | 12.5 | 12.5 | 17 | 17 | 17 | 25 | 4 |
| (mole %) | $Ba_4Zr_4Si_6O_{24}$ | | | | | | | | 4 |
| | $Y_{2/3}Zr_4P_6O_{24}$ | 37.5 | 37.5 | 37.5 | | | | | |
| Crystal- | RZSP solid solved phase | 80 | 60 | 20 | 80 | 60 | 20 | 58 | 70 |
| line phase | Zircon | 20 | 40 | 80 | 20 | 40 | 80 | 42 | 30 |
| | Other crystalline phase | — | — | — | — | — | — | — | — |

TABLE 1 (b)-3

| | Example | | | | | | | |
|---|---|---|---|---|---|---|---|---|
| | 19 | 20 | 21 | 22 | 23 | 24 | 25 | 26 |
| Lattice parameter of main crystalline phase | | | | | | | | |
| a (Å) | 8.65 | 8.65 | 8.65 | 8.69 | 8.69 | 8.69 | 8.75 | 8.69 |
| c (Å) | 23.43 | 23.43 | 23.43 | 24 | 24 | 24 | 23.33 | 22.89 |
| Producing conditions | | | | | | | | |

TABLE 1 (b)-3-continued

| | Example | | | | | | | |
|---|---|---|---|---|---|---|---|---|
| | 19 | 20 | 21 | 22 | 23 | 24 | 25 | 26 |
| Firing temperature (°C.) | 1600 | 1600 | 1600 | 1600 | 1600 | 1600 | 1700 | 1450 |
| Keeping time (hr) | 5 | 5 | 5 | 10 | 10 | 10 | 1 | 24 |
| Firing shrinkage factor (%) | 13.6 | 14 | 18.5 | 12.8 | 13.4 | 17.1 | 21 | 15 |
| Characteristics of sintered body | | | | | | | | |
| Open porosity (%) | 26 | 23.1 | 16.7 | 20 | 19.1 | 14 | 8.9 | 18.1 |
| Bending strength (kg/cm$^2$) | 540 | 790 | 1400 | 610 | 840 | 1440 | 700 | 530 |
| Weight-reduced percentage (1400° C. × 100 hr, %) | 1.1 | 0.9 | 0.7 | 0.4 | 0.4 | 0.3 | 0.3 | 0.6 |
| Dimensional change percentage (1400° C. × 100 hr, %) | −0.1 | −0.1 | 0 | −0.1 | −0.1 | 0 | | −0.3 |
| Self-weight softening percentage (1400° C. × 5 hr, %) | 0.11 | 0.12 | 0.14 | 0.20 | 0.21 | 0.22 | | 0.3 |
| Coefficient of thermal expansion (×10$^{-7}$/°C., RT-1400° C.) | 22 | 30 | 40 | 14 | 25 | 39 | 20 | 21 |
| Thermal expansion hysteresis loss (%) | | | | | | | | |
| Melting point (°C.) | >1700 | >1700 | >1700 | >1700 | >1700 | >1700 | >1700 | >1700 |

TABLE 1 (a)-4

| | | Comparative Example | | | | | | | | |
|---|---|---|---|---|---|---|---|---|---|---|
| | | 31 | 32 | 33 | 34 | 35 | 36 | 37 | 38 | 39 |
| Compounding recipe (wt %) | Zr$_2$P$_2$O$_9$ | 37.5 | 46.9 | 35.8 | 52.5 | 52.5 | 34.2 | 49.2 | 49.7 | 0 |
| | ZrP$_2$O$_7$ | 52.8 | 38.3 | 50.4 | 22.8 | 22.8 | 48.1 | 21.3 | 30.1 | 0 |
| | CaCO$_3$ | 9.7 | 11.9 | 0 | 0 | 0 | 0 | 0 | 0 | 0 |
| | SrCO$_3$ | 0 | 0 | 13.8 | 19.5 | 19.5 | 0 | 0 | 13.5 | 0 |
| | BaCO$_3$ | 0 | 0 | 0 | 0 | 0 | 17.7 | 24.6 | 0 | 0 |
| | ZrO$_2$ | 0 | 0 | 0 | 0 | 0 | 0 | 0 | 0 | 0 |
| | Y$_2$O$_3$ | 0 | 0 | 0 | 0 | 0 | 0 | 0 | 2.6 | 0 |
| | SiO$_2$ | 0 | 2.9 | 0 | 5.2 | 5.2 | 0 | 4.9 | 4.1 | 0 |
| | ZrSiO$_4$ | 0 | 0 | 0 | 0 | 0 | 0 | 0 | 0 | 100 |
| | Total | 100 | 100 | 100 | 100 | 100 | 100 | 100 | 100 | 100 |
| Chemical composition of RZSP solid solved phase (mole %) | CaZr$_4$P$_6$O$_{24}$ | 100 | 92 | | | | | | | |
| | SrZr$_4$P$_6$O$_{24}$ | | | 100 | 83 | 83 | | | 50 | |
| | BaZr$_4$P$_6$O$_{24}$ | | | | | | 100 | 83 | | |
| | NiZr$_4$P$_6$O$_{24}$ | | 8 | | | | | | | |
| | Ca$_4$Zr$_4$Si$_6$O$_{24}$ | | | | 17 | 17 | | | | |
| | Sr$_4$Zr$_4$Si$_6$O$_{24}$ | | | | | | | 17 | 12.5 | |
| | Ba$_4$Zr$_4$Si$_6$O$_{24}$ | | | | | | | | | |
| | Y$_{2/3}$Zr$_4$P$_6$O$_{24}$ | | | | | | | | 37.5 | |
| Crystalline phase | RZSP solid solved phase | | 100 | | 100 | 100 | | 100 | 100 | |
| | Zircon | CaZr$_4$P$_6$O$_{24}$ | — | SrZr$_4$P$_6$O$_{24}$ | — | — | BaZr$_4$P$_6$O$_{24}$ | — | — | 100 |
| | Other crystalline phase | 100 | — | 100 | — | — | 100 | — | — | |

TABLE 1 (b)-4

| | Comparative Example | | | | | | | | |
|---|---|---|---|---|---|---|---|---|---|
| | 31 | 32 | 33 | 34 | 35 | 36 | 37 | 38 | 39 |
| Lattice parameter of main crystalline phase | | | | | | | | | |
| a (Å) | 8.79 | 8.79 | 8.72 | 8.74 | 8.74 | 8.68 | 8.69 | 8.65 | |
| c (Å) | 2.72 | 22.68 | 23.36 | 23.34 | 23.34 | 23.95 | 24 | 23.43 | |
| Producing conditions | | | | | | | | | |
| Firing temperature (°C.) | 1550 | 1600 | 1600 | 1600 | 1500 | 1600 | 1600 | 1600 | 1600 |
| Keeping time (hr) | 5 | 5 | 5 | 5 | 5 | 5 | 10 | 5 | 5 |
| Firing shrinkage factor (%) | 14.6 | 19.1 | 16.2 | 18.7 | 16.5 | 10.4 | 12.2 | 12.9 | |
| Characteristics of sintered body | | | | | | | | | |
| Open porosity (%) | 16.1 | 5.5 | 17.2 | 4.7 | 12.7 | 26.5 | 21.5 | 28.7 | |
| Bending strength (kg/cm$^2$) | 110 | 330 | 640 | 200 | 290 | 320 | 330 | 300 | 2000 |
| Weight-reduced percentage (1400° C. × 100 hr, %) | 3 | 0.65 | 0.6 | 0.3 | 0.4 | 2.4 | 0.5 | 1.2 | |
| Dimensional change percentage (1400° C. × 100 hr, %) | 1.8 | −2.9 | −0.25 | 0.2 | −0.9 | −0.2 | −0.2 | −0.2 | |
| Self-weight softening percentage (1400° C. × 5 hr, %) | 0.03 | 0.1 | 0.01 | 0.1 | 0.1 | 0 | 0.19 | 0.1 | |
| Coefficient of thermal expansion (×10$^{-7}$/°C., RT-1400° C.) | −15 | −9 | 25 | −20 | −8.5 | 23 | −4 | 13 | 42 |
| Thermal expansion hysteresis loss (%) | | | 0 | 0.14 | | 0 | | | |
| Melting point (°C.) | >1700 | >1700 | >1700 | >1700 | >1700 | >1700 | >1700 | >1700 | |

TABLE 2

|  | $ZrO_2$ griding media stabilized with MgO | $ZrO_2$ griding media stabilized with $Y_2O_3$ |
|---|---|---|
| $SiO_2$ | 0.28 | <0.05 |
| $Al_2O_3$ | 0.037 | <0.02 |
| $Fe_2O_3$ | 0.14 | 0.10 |
| $TiO_2$ | 0.12 | <0.01 |
| CaO | 0.29 | <0.005 |
| MgO | 3.37 | 0.007 |
| $K_2O$ | 0.010 | <0.005 |
| $Na_2O$ | 0.047 | <0.01 |
| $Y_2O_3$ | — | 5.04 |
| $ZrO_2$ | 94.19 | 92.90 |
| $ZrO_2$ | 1.65 | 2.11 |
| Total | 100.13 | 100.16 |

TABLE 3

| | Chemical analysis values | | | | | | | | |
|---|---|---|---|---|---|---|---|---|---|
| | $ZrO_2$ | $P_2O_5$ | $SiO_2$ | $Al_2O_3$ | MgO | CaO | NaKO | Ig loss | $Fe_2O_3$ |
| $(ZrO)_2P_2O_7$ | 61.85 | 36.38 | <0.2 | 0.01 | 0.45 | 0.02 | 0.01 | 3.20 | <0.01 |
| $ZrP_2O_7$ | 46.44 | 52.24 | 0.02 | <0.01 | <0.01 | <0.01 | <0.01 | 2.86 | <0.01 |
| $CaCO_3$ | — | — | — | — | — | 55.72 | <0.01 | 43.78 | <0.01 |
| $SrCO_3$ | — | — | 0.001 | <0.001 | 0.001 | 0.11 | 0.012 | 30.15 | 0.018 |
| $BaCO_3$ | — | — | — | — | — | — | — | 22.30 | <0.01 |
| $SiO_2$ | — | — | 99.68 | 0.07 | 0.018 | <0.002 | <0.005 | 0.07 | 0.038 |
| $ZrO_2$ | 98.65 | — | 0.06 | 0.01 | 0.01 | 0.04 | 0.02 | 0.38 | <0.01 |
| $Y_2O_3$ | — | — | <0.01 | — | — | <0.01 | — | — | <0.01 |
| $ZrSiO_4$ | 66.63 | — | 32.62 | 0.35 | 0.002 | 0.001 | 0.06 | 0.21 | 0.054 |
| $Ca_3P_2O_8$ | | 45.53 | 0.01 | 0.02 | | 53.97 | 0.01 | 0.10 | <0.01 |

| | Chemical analysis values | | | | | | Average grain diameter |
|---|---|---|---|---|---|---|---|
| | SrO | BaO | $CeO_2$ | $Gd_2O_3$ | $TiO_2$ | $Y_2O_3$ | (μm) |
| $(ZrO)_2P_2O_7$ | — | — | — | — | — | — | 0.9 |
| $ZrP_2O_7$ | — | — | — | — | — | — | 1.0 |
| $CaCO_3$ | — | — | — | — | — | — | 2.2 |
| $SrCO_3$ | 69.61 | — | — | — | — | — | 0.6 |
| $BaCO_3$ | — | 76.50 | — | — | — | — | 10.0 |
| $SiO_2$ | — | — | — | — | 0.004 | — | 1.0 |
| $ZrO_2$ | — | — | — | — | 0.15 | — | 0.9 |
| $Y_2O_3$ | — | — | — | — | — | >99.9 | 1.0 |
| $ZrSiO_4$ | — | — | — | — | 0.095 | — | 1.0 |
| $Ca_3P_2O_8$ | — | — | — | — | — | — | 2.0 |

As is clear from the results of Examples 1–26 and Comparative Examples 31–39 shown in Table 1, the heat resistive composite bodies were obtained by coexisting the $R_yZr_4Si_xP_{6-x}O_{24}$ solid solved phase and the zircon phase in the sintered bodies having the composition (1) or (2) given above. Further, the composite bodies according to the present invention were obtained by sintering the batch mixtures obtained by mixing materials selected from $ZrP_2O_7$, $(ZrO)_2P_2O_7$, $ZrO_2$, $ZrSiO_4$, $SiO_2$, phosphates of R, and RO, R denotes elements capable of becoming bivalent or trivalent cations under the firing conditions given in Table 1.

Figure 2:
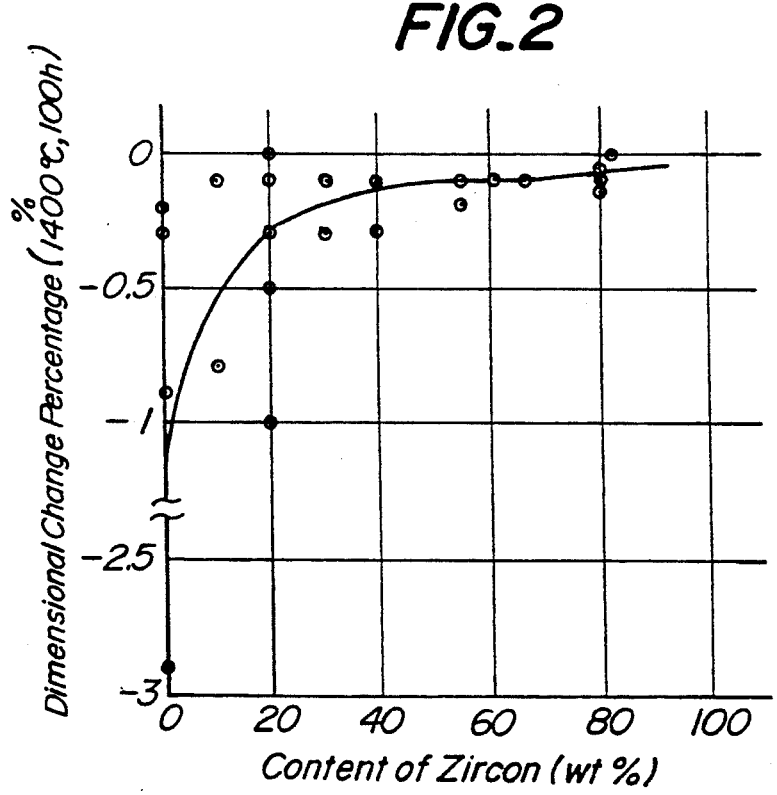
FIG. 2 is a graph in which contents of zircon and dimensional change percentages in the thermal treatment at 1,400° C. for 100 hours are plotted.
Figure 3:
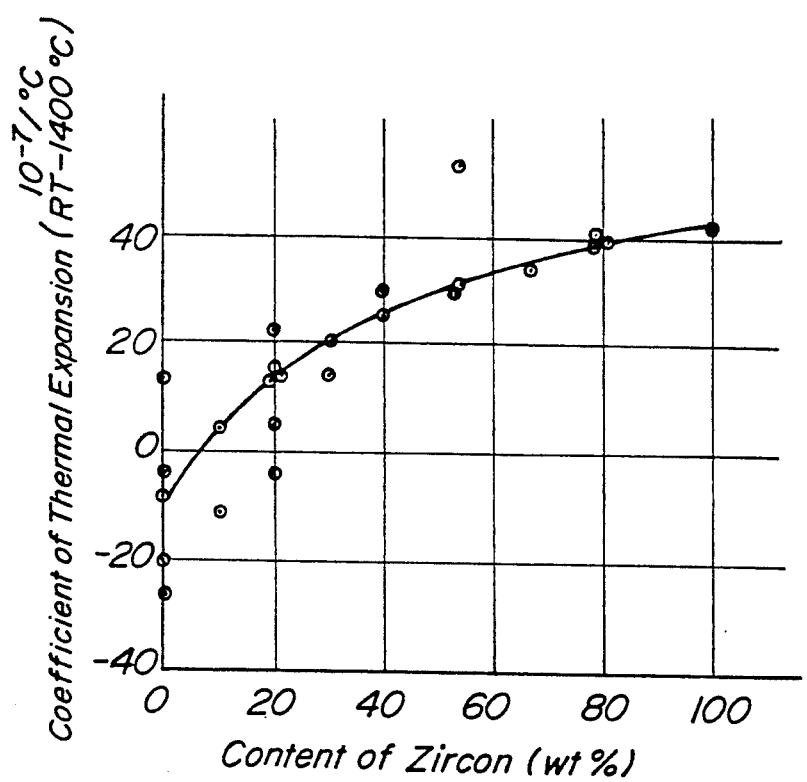
FIG. 3 is a graph in which contents of zircon and coefficients of thermal expansion in a range of room temperature to 1,400° C. are plotted.
Figure 4:
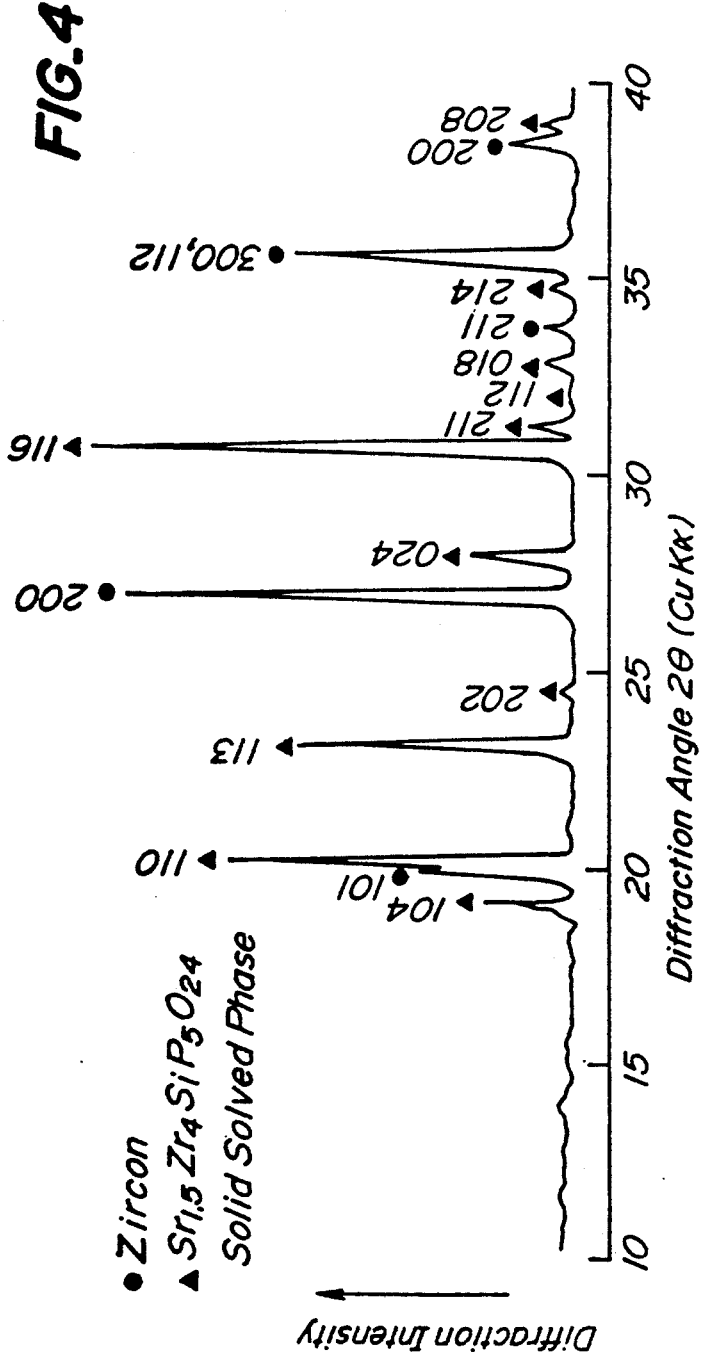
FIG. 4 is a view illustrating an X ray diffraction pattern of powder of a sintered body in Example 3 at room temperature.

FIG. 1 shows the relationship between the content of zircon and the four point bending strength in the heat resistive phosphate-zircon composite body. FIG. 2 shows the relationship between the content of zircon and the dimensional change percentage in the thermal treatment at 1,400° C. for 100 hours. FIG. 3 shows the relationship between the content of zircon and the coefficient of thermal expansion in the range from room temperature to 1,400° C. FIG. 4 shows the X ray diffraction pattern of the powder in Example 3 at room temperature, which shows that the composite body comprises the solid phase of $Sr_{1.5}Zr_4SiP_5O_{24}$ and the zircon phase.

It is seen from the above results that the heat resistive phosphate-zircon composite bodies having particularly high strength can be obtained when the composite bodies comprising the solid phase of $R_yZr_4Si_xP_{6-x}O_{24}$ and zircon have the given composition as the sintered bodies.

As mentioned above, according to the heat resistive phosphate-zircon composite bodies and the production process thereof in the present invention, the heat resistive composite bodies having high strength, low expansion, and excellent high temperature stability can be obtained.

Therefore, the composite bodies are shaped, for example, in the form of honeycomb structural bodies required to have heat resistance, low expansion and high temperature stability by extrusion, the composite bodies may be widely used as rotary regeneration type ceramic heat exchangers, heat conduction type heat exchangers, diesel particulate filters, automobile exhaust gas purifier catalyst carriers, catalyst combustion carriers, and insulating materials for housing for ceramic turbocharger rotors and engine manifolds which are shaped by slip casting, press molding, or injection molding.

What is claimed is:

1. A heat resistive phosphate-zircon sintered composite body consisting essentially of:
   a main, solid-solved crystalline phase of $R_yZr_4Si_xP_{6-x}O_{24}$, wherein R is at lest one element selected from the group consisting of Sr, Ca and Y, $0<x<2$, and $\frac{2}{3}<y<2$, provided that x and y satisfy electrical neutrality; and
   a secondary crystalline phase of not less than 10 wt% zircon;
   wherein the sintered composite body has a composition of $\{a(R_yZr_4Si_xP_{6-x}O_{24})+b(ZrSiO_4)\}$ in which $0.2 \leq a \leq 0.9$ and $a+b=1$, a four point bending strength of not less than 350 kg/cm², and a dimensional change percentage and weight-reduced percentage, when the sintered body is held at 1,400° C. for 100 hours, of not more than 1% and not more than 1 wt%, respectively.

2. A heat resistive phosphate-zircon sintered composite body consisting essentially of:
  a main, solid-solved crystalline phase of $R_yZr_4Si_xP_{6-x}O_{24}$, wherein $0<x<2$, $\frac{2}{3}<y<2$, provided that x and y satisfy electrical neutrality, and R is at least one element selected from the group consisting of Sr, Ca and Y; and
  a secondary, crystalline phase of not less than 10 wt% zircon;
  wherein the sintered composite body has a composition of $R_sZr_4Si_tP_{6-t}O_{24-t/2}$, in which $s=2n$, $0<t\leq 4$ and n is a valance of ions of R, a four point bending strength of not less than 350 kg/cm², and a dimensional change percentage and weight-reduced percentage, when the sintered body is held at 1,400° C. for 100 hours, of not more than 1% and not more than 1 wt%, respectively.

3. A method of producing a heat resistive phosphate-zircon sintered composite body, comprising the steps of:
  mixing measured amount of materials including: $ZrP_2O_7$; $(ZrO)_2P_2O_7$; RO and/or a phosphate of R in which R is at least one element selected from the group consisting of Sr, Ca and Y; $SiO_2$; and a zircon powder;
  shaping the mixture to produce a shaped body; and
  firing the shaped body;
  wherein the amounts of $ZrSiO_4$, $ZrP_2O_7$, $(ZrO)_2P_2O_7$, RO and/or the phosphate of R, and $SiO_2$ are measured such that the composite body comprises:
  a main crystalline phase composed of a solid-solved phase of $R_yZr_4Si_xP_{6-x}O_{24}$, wherein $0<x<2$, $\frac{2}{3}<y<2$, x and y satisfy electrical neutrality, and R is at least one element selected from the group consisting of Sr, Ca and Y;
  a secondary crystalline phase of zircon; and
  a composition of $\{a(R_yZr_4Si_xP_{6-x}O_{24})+b(ZrSiO_4)\}$ in which $0.2\leq a\leq 0.9$ and $a+b=1$.

4. A method of producing a heat resistive phosphate-zircon sintered composite body, comprising the steps of:
  mixing measured amounts of starting materials including: $(ZrO)_2P_2O_7$; RO and/or a phosphate of R in which R is at least one element selected from the group consisting of Sr, Ca and Y; $ZrO_2$; and $SiO_2$;
  shaping the mixture to produce a shaped body; and
  firing the shaped body;
  wherein the amounts of said starting materials are measured such that the composite body comprises:
  a main crystalline phase composed of a slid-solved phase of $R_yZr_4Si_xP_{6-x}O_{24}$, wherein $0<x<2$, $\frac{2}{3}<y<2$, x and y satisfy electrical neutrality, and R is at least one element selected from the group consisting of Sr, Ca and Y;
  a secondary crystalline phase of zircon; and
  a composition of $R_sZr_4Si_tP_{6-t}O_{24-t/2}$ in which $s=2/n$, $0<t\leq 4$, and n is a valance of ions of R.

* * * * *